(12) United States Patent
Xu

(10) Patent No.: US 12,716,546 B2
(45) **Date of Patent: *Aug. 25, 2026**

(54) FAST-DETACHING STRUCTURE

(71) Applicant: Shanghai Maodouya Automotive Electronics Co., Ltd., Shanghai (CN)

(72) Inventor: Hechuan Xu, Shanghai (CN)

(73) Assignee: Shanghai Maodouya Automotive Electronics Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/248,458

(22) Filed: Jun. 25, 2025

(65) Prior Publication Data

US 2025/0320958 A1 Oct. 16, 2025

Related U.S. Application Data

(63) Continuation-in-part of application No. 18/757,664, filed on Jun. 28, 2024, now Pat. No. 12,366,260.

(30) Foreign Application Priority Data

Jan. 16, 2024 (CN) ........................ 202420107010.4

(51) Int. Cl.
*F16M 13/00* (2006.01)
*F16B 17/00* (2006.01)

(52) U.S. Cl.
CPC .......... *F16M 13/005* (2013.01); *F16B 17/00* (2013.01); *F16M 2200/08* (2013.01)

(58) Field of Classification Search
CPC ...... F16B 5/0664; F16B 5/0016; B60R 11/04; B60R 2011/0078
See application file for complete search history.

(56) References Cited

U.S. PATENT DOCUMENTS

| | | | | |
|---|---|---|---|---|
| 4,697,783 | A * | 10/1987 | Kastendieck | A42B 3/042 403/321 |
| 5,332,183 | A * | 7/1994 | Kagayama | B62J 6/03 248/223.41 |
| 5,484,223 | A * | 1/1996 | Saito | H01R 13/4368 439/752 |
| 5,988,572 | A * | 11/1999 | Chivallier | B60R 11/0241 248/176.1 |
| 6,811,348 | B1 * | 11/2004 | Meyer | A42B 3/04 403/324 |
| 7,011,285 | B2 * | 3/2006 | Wang | F16M 11/10 248/673 |
| 7,300,297 | B1 * | 11/2007 | Wang | H01R 27/00 439/173 |

(Continued)

*Primary Examiner* — Bradley Duckworth

(57) ABSTRACT

A fast-detaching structure for a mounting member defining a mounting slot is provided. The mounting member includes a bottom wall and at least one side wall. The bottom wall and the at least one side wall cooperatively define the mounting slot. The bottom wall defines a slot. The fast-detaching structure includes a connection assembly and a snapping member. The connection assembly is detachably mounted in the mounting slot and includes a fixed end and a snapping end. The fixed end abuts against the side wall, and the snapping end is connected to the fixed end. The snapping member is arranged on the snapping end and capable of being engaged in or disengaged from the slot.

20 Claims, 23 Drawing Sheets

(56) References Cited

U.S. PATENT DOCUMENTS

| | | | | |
|---|---|---|---|---|
| 7,481,403 | B2 * | 1/2009 | Yuan | F16M 11/041 403/321 |
| 8,267,614 | B2 * | 9/2012 | Khoe | F16B 5/0016 296/72 |
| 8,448,829 | B2 * | 5/2013 | Watanabe | H05K 5/0073 224/547 |
| 8,656,563 | B2 * | 2/2014 | Hiramatsu | F16B 37/043 52/716.5 |
| 8,939,674 | B2 * | 1/2015 | Zimmer | B29C 66/1282 403/14 |
| 10,638,622 | B2 * | 4/2020 | Kato | H05K 5/0204 |
| 11,148,612 | B2 * | 10/2021 | Ueta | G03B 17/561 |
| 11,338,742 | B2 * | 5/2022 | Inayoshi | B60R 11/04 |
| 11,933,349 | B2 * | 3/2024 | Fan | F16B 5/0664 |
| 12,366,260 | B1 * | 7/2025 | Xu | F16B 9/01 |
| 2012/0099850 | A1 * | 4/2012 | Onishi | B60R 11/04 396/419 |
| 2018/0187828 | A1 * | 7/2018 | Law | F16M 11/125 |
| 2022/0219620 | A1 * | 7/2022 | Persson | G03B 11/045 |
| 2023/0324953 | A1 * | 10/2023 | Kim | F16M 11/2064 |
| 2024/0053174 | A1 * | 2/2024 | Mcguire | G01D 11/245 |
| 2025/0222876 | A1 * | 7/2025 | Ogonek | B60R 11/00 |

* cited by examiner

FAST-DETACHING STRUCTURE

CROSS-REFERENCE TO RELATED APPLICATIONS

This application is a continuation-in-part of the U.S. application Ser. No. 18/757,664, filed on Jun. 28, 2024, and claims the priority of the Chinese patent application No. 202420107010.4, filed on Jan. 16, 2024. The contents of which are hereby incorporated by reference in their entireties.

FIELD

The present disclosure relates to the field of communication technology, and particularly to a fast-detaching structure.

BACKGROUND

Some small antennas or satellite signal receiving panels are usually mounted on vehicles, outdoors, rooftops, ship masts, and other supporting objects via connection assemblies. Particularly, products such as an antenna body or satellite signal receiving panel are referred to as supported objects. The supported object is arranged with a mounting member (or the supported object serves as the mounting member), and the mounting member can define a mounting slot adapted to the connection assembly. The mounting slot is shown in FIG. 1, where the mounting member has a bottom wall and a side wall, and the bottom wall and the side wall cooperatively define the mounting slot. The side wall is arranged on the bottom wall, and is arranged with a fixation edge. The mounting slot has an open side, allowing the connection assembly to enter or exit the mounting slot from the open side.

Considering packaging costs and portability, the connection assembly and the mounting member are arranged as two independent products. During use, the user needs to assemble the connection assembly with the mounting member, and at the same time, to ensure connection reliability, a fastening member is required to lock the connection assembly to the mounting member, which leads to a need for specific tools such as screwdrivers, wrenches, hammers, etc., for disassembly and assembly. This operation is inconvenient and reduces portability.

SUMMARY

The present disclosure provides a fast-detaching structure. The fast-detaching structure is used for a mounting member defining a mounting slot. The mounting member includes a bottom wall and at least one side wall. The bottom wall and the at least one side wall cooperatively define the mounting slot. The bottom wall defines a slot. The fast-detaching structure includes a connection assembly and a snapping member. The connection assembly is detachably mounted in the mounting slot and includes a main body and a snapping arm. The main body abuts against the side wall, and the snapping arm is connected to the main body. The snapping member is arranged on the snapping arm and capable of being engaged in or disengaged from the slot.

BRIEF DESCRIPTION OF THE DRAWINGS

In order to more clearly illustrate technical solutions in the embodiments of the present disclosure or in the art, the accompanying drawings for describing the embodiments of the present disclosure or in the art will be briefly introduced in the following. Obviously, the following description of the accompanying drawings shows only some of the embodiments of the present disclosure, and any ordinary skilled person in the art may obtain other accompanying drawings according to the following drawings without making creative work.

REFERENCE NUMERALS

- 1—mounting member; 100—mounting slot; 101—front side; 102—back side; 10—side wall; 11—bottom wall; 12—positioning wall; 13—fixation edge; 14—limiting wall; 15—open side; 110—slot; 141—connection post; 1411—wire channel;
- 2—connection assembly; 21—first connection member; 22—second connection member; 23—main body; 24—snapping arm; 25—connection portion; 26—extension member; 27—handle; 201—side of the connection assembly away from the mounting member; 211—receiving cavity; 221—rotation shaft; 231—front side wall; 232—abutting side wall; 241—drive portion; 242—bottom surface of the snapping arm; 2311—receiving port; 2312—shaft hole; 2313—top surface of the front side wall; 2321—connecting rod; 2322—abutting edge; 23211—front end of the connecting rod; 200—avoidance space;
- 3—snapping member; 31—snapping tab;
- 4—supported object;
- 5—supporting object;
- 6—conducting wire;
- 7—magnetic attraction assembly; 71—first magnetic member; 72—second magnetic member;
- 8—additional supporting member; 81—mounting portion;
- 9—casing; 91—connecting plate; 92—through hole; 9*a*—storage member.

DETAILED DESCRIPTION

Unless otherwise defined, all technical and scientific terms used herein have the same meaning as commonly understood by any ordinary skilled person in the art. The terms used herein in the specification of the application are used only for the purpose of describing specific embodiments and do not limit the scope of the present disclosure. The terms "include", "comprise", and any variation thereof used in the specification, the claims, the drawings of the present disclosure are intended to cover non-exclusive inclusion. The terms "first", "second", and so on, in the specification, claims, and drawings of the present disclosure are used to distinguish different objects and are not intended to describe a particular order.

Reference to "embodiments" herein implies that particular features, structures, or properties described in an embodiment may be included in at least one embodiment of the present disclosure. The presence of the term at various sections in the specification does not necessarily refer to a same embodiment, nor a separate or an alternative embodiment that is mutually exclusive of other embodiments. Any ordinary skilled person in the art shall understand, both explicitly and implicitly, that the embodiments described herein may be combined with other embodiments.

In order to enable any ordinary skilled person in the art to better understand the embodiments of the present disclosure, the technical solutions in the embodiments of the present disclosure will be clearly and completely described below by referring to the accompanying drawings.

Figure 1:
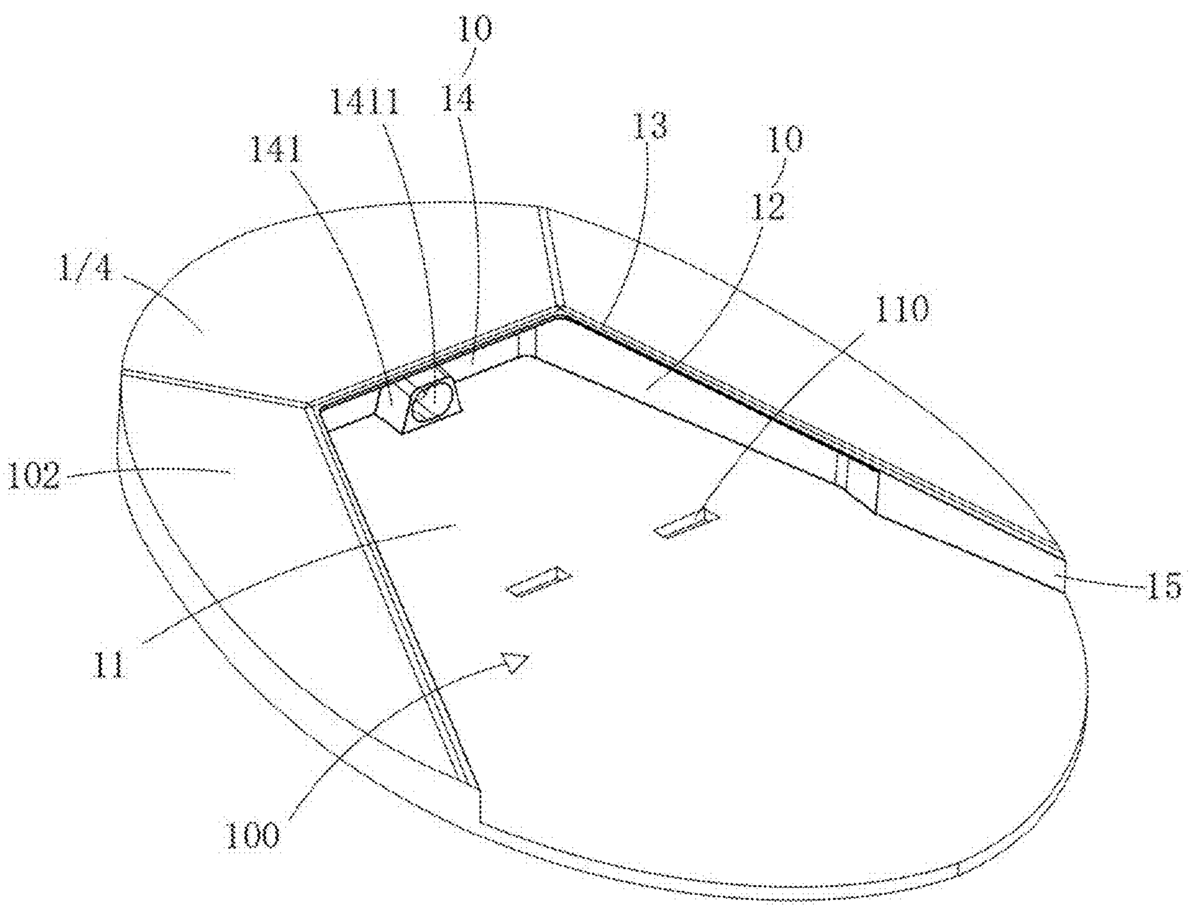
FIG. 1 is a structural view of a mounting member, showing slots formed in the mounting member.
Figure 2:
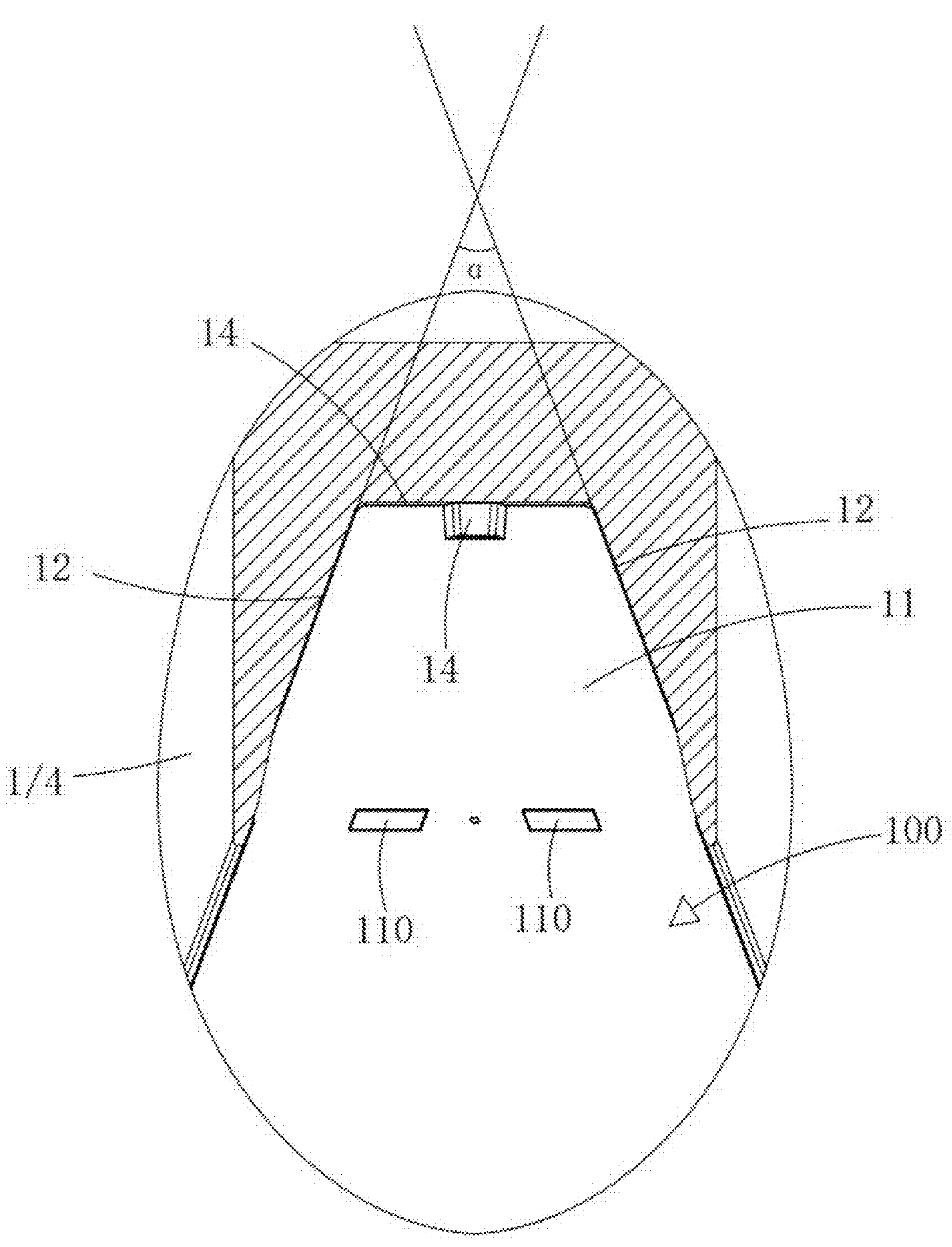
FIG. 2 is another structural view of the mounting member, showing the slots formed in the mounting member.
Figure 3:
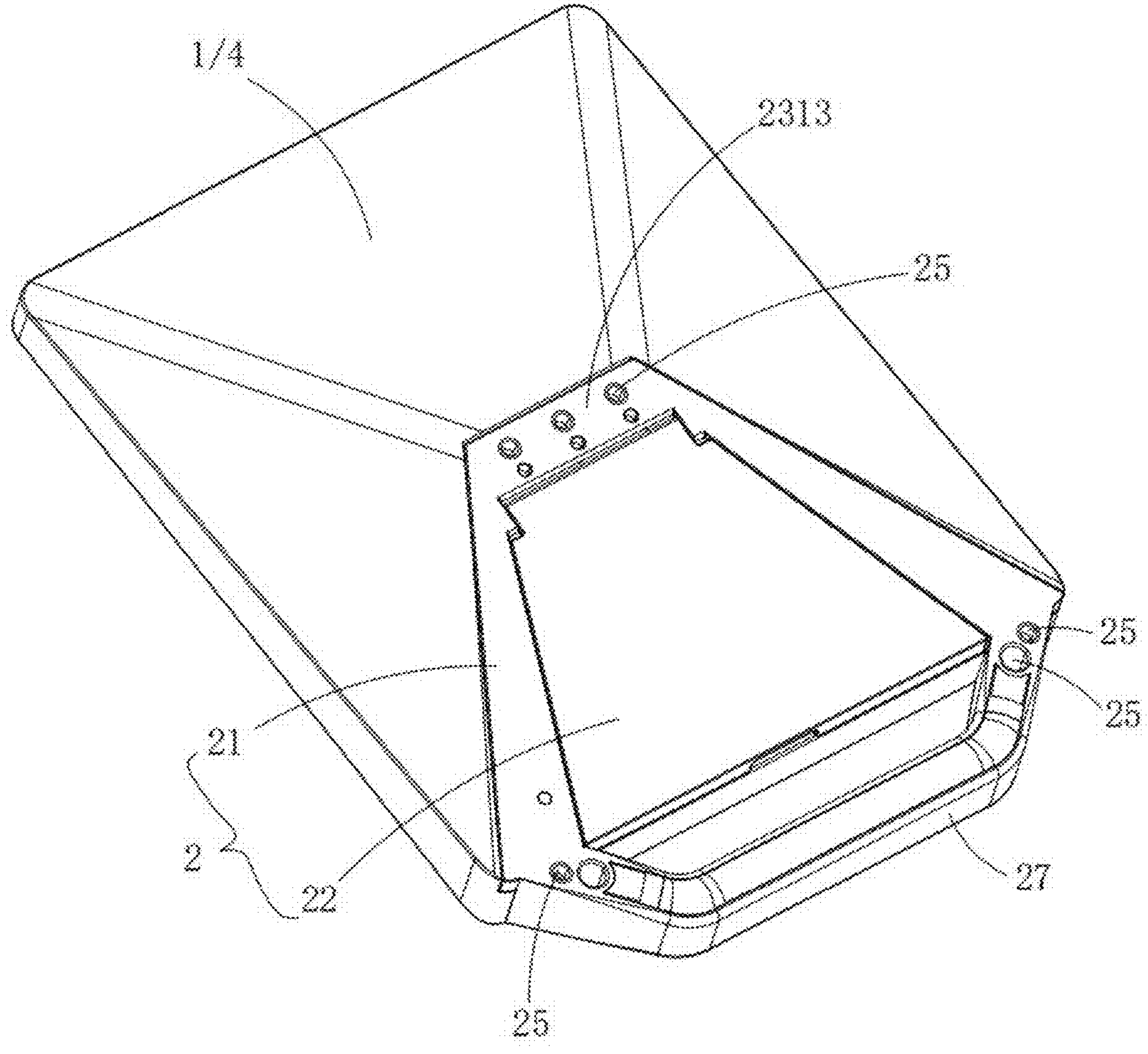
FIG. 3 is a schematic view of an overall structure of a fast-detaching structure according to an embodiment of the present disclosure, showing a second connection member covering a receiving cavity.

Referring to FIGS. 1 to 23, the present disclosure provides a fast-detaching structure. The fast-detaching structure is applicable to a mounting member 1 having a mounting slot 100. The mounting slot 100 is shown in FIG. 1. The mounting member 1 includes a bottom wall 11 and at least one side wall 10. The bottom wall 11 and the at least one side wall 10 cooperatively define the mounting slot 100. The at least one side wall 10 is arranged on the bottom wall 11. The at least one side wall 10 is arranged with a fixation edge 13. The bottom wall 11 defines at least one slot 110.

Figure 6:
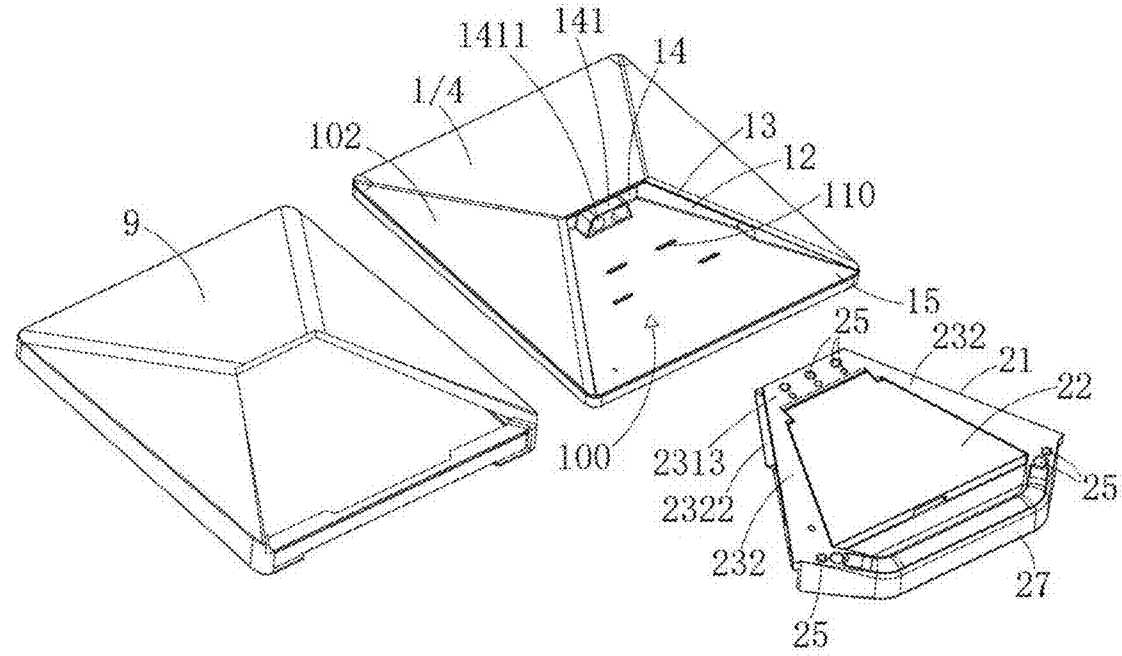
FIG. 6 is an exploded view of the fast-detaching structure according to an embodiment of the present disclosure.
Figure 7:
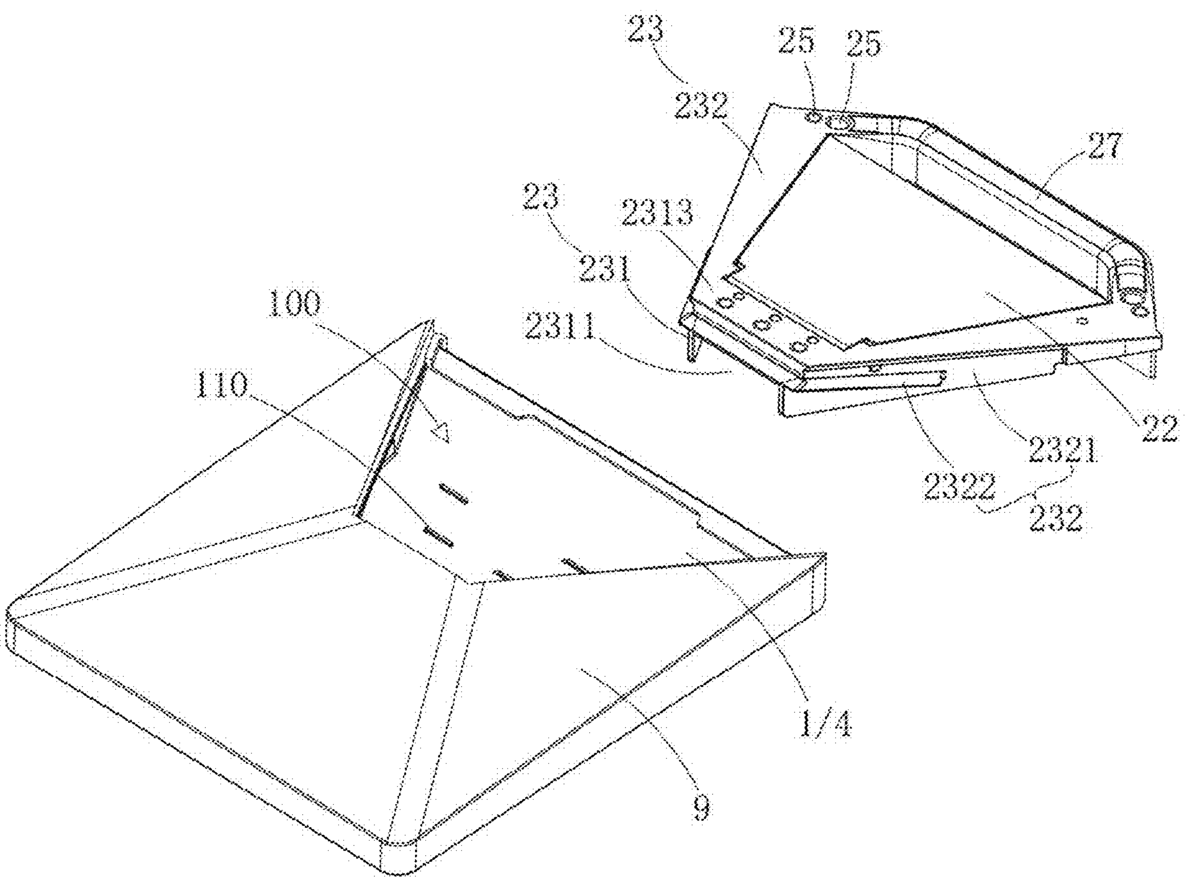
FIG. 7 is another exploded view of the fast-detaching structure according to an embodiment of the present disclosure.
Figure 13:
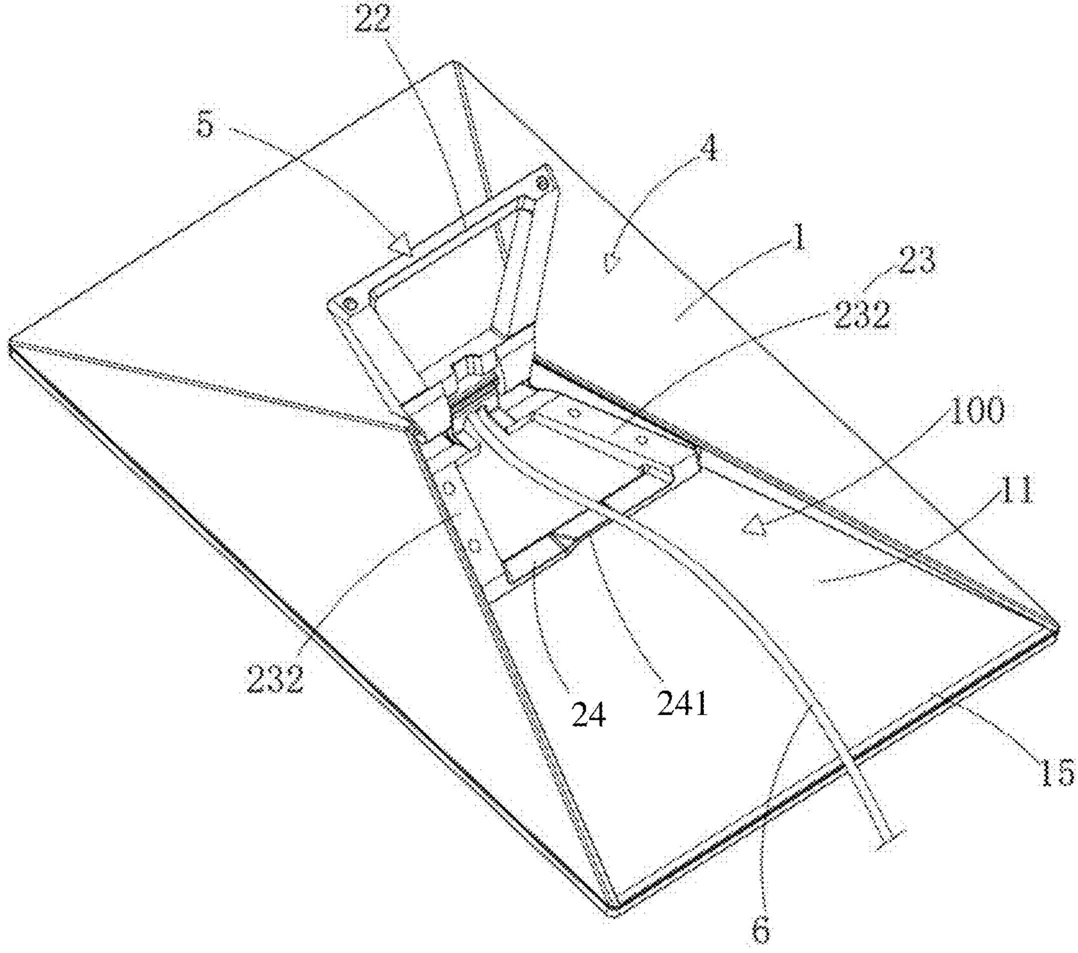
FIG. 13 is a structural view of the fast-detaching structure according to further another embodiment of the present disclosure, showing the connection assembly mounted in the mounting slot.

The mounting member 1 can be integrated with a supported object 4 or the mounting member 1 can be a part of the supported object 4, as shown in FIGS. 1, 6, and 13. Alternatively, the mounting member 1 can also be produced as a separate item and used for being mounted on the supported object 4. The following embodiments will describe the case where the mounting member 1 is a part of the supported object 4.

Specifically, the at least one side wall 10 includes two positioning walls 12. Each of the two positioning walls 12 is arranged with the fixation edge 13. An angle is formed between the two positioning walls 12, such as the angle $\alpha$ shown in FIG. 2. The bottom wall 11 is connected to the two positioning walls 12, and the at least one slot 110 is defined in the bottom wall 11. The fixation edge 13 is arranged on a side of a corresponding positioning wall 12 away from the bottom wall 11 and extends inward towards the mounting slot 100.

The fast-detaching structure includes a connection assembly 2 and at least one snapping member 3. The connection assembly 2 is detachably mounted in the mounting slot 100. The connection assembly 2 can support or connect a supporting object 5. The connection assembly 2 includes a main body 23 and a snapping arm 24. The main body 23 abuts against the two positioning walls 12 and the corresponding fixation edges 13. The snapping arm 24 is connected to the main body 23. The snapping member 3 is arranged on the snapping arm 24 and can be engaged in or disengaged from the slot 110 in the bottom wall 11.

For example, two slots 110 are shown in FIG. 1, and four slots 110 are shown in FIG. 6, and even more slots 110 can be provided. The number of the snapping members 3 can be set to only one or according to the number of the slots 110 to flexibly arrange a use position of the snapping member 3.

Figure 5:
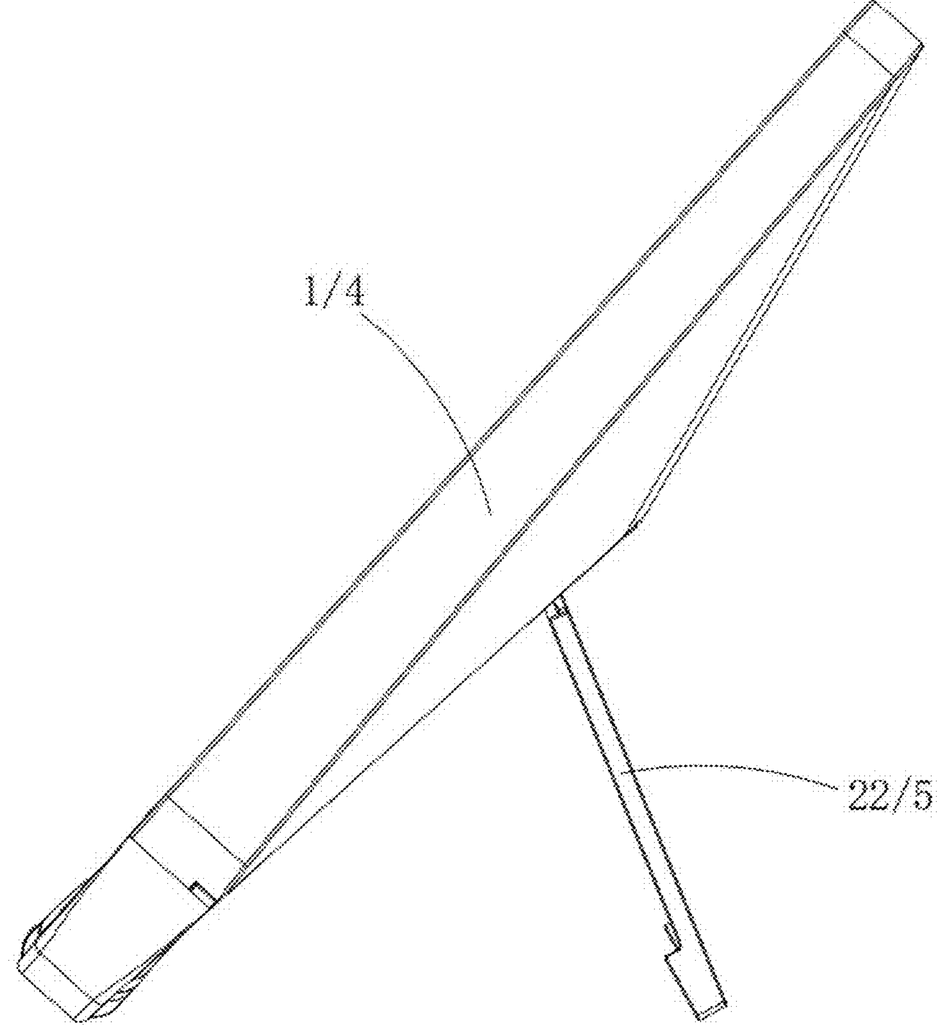
FIG. 5 is a schematic view of the overall structure of the fast-detaching structure according to an embodiment of the present disclosure, with the second connection member used as a supporting object.
Figure 23:
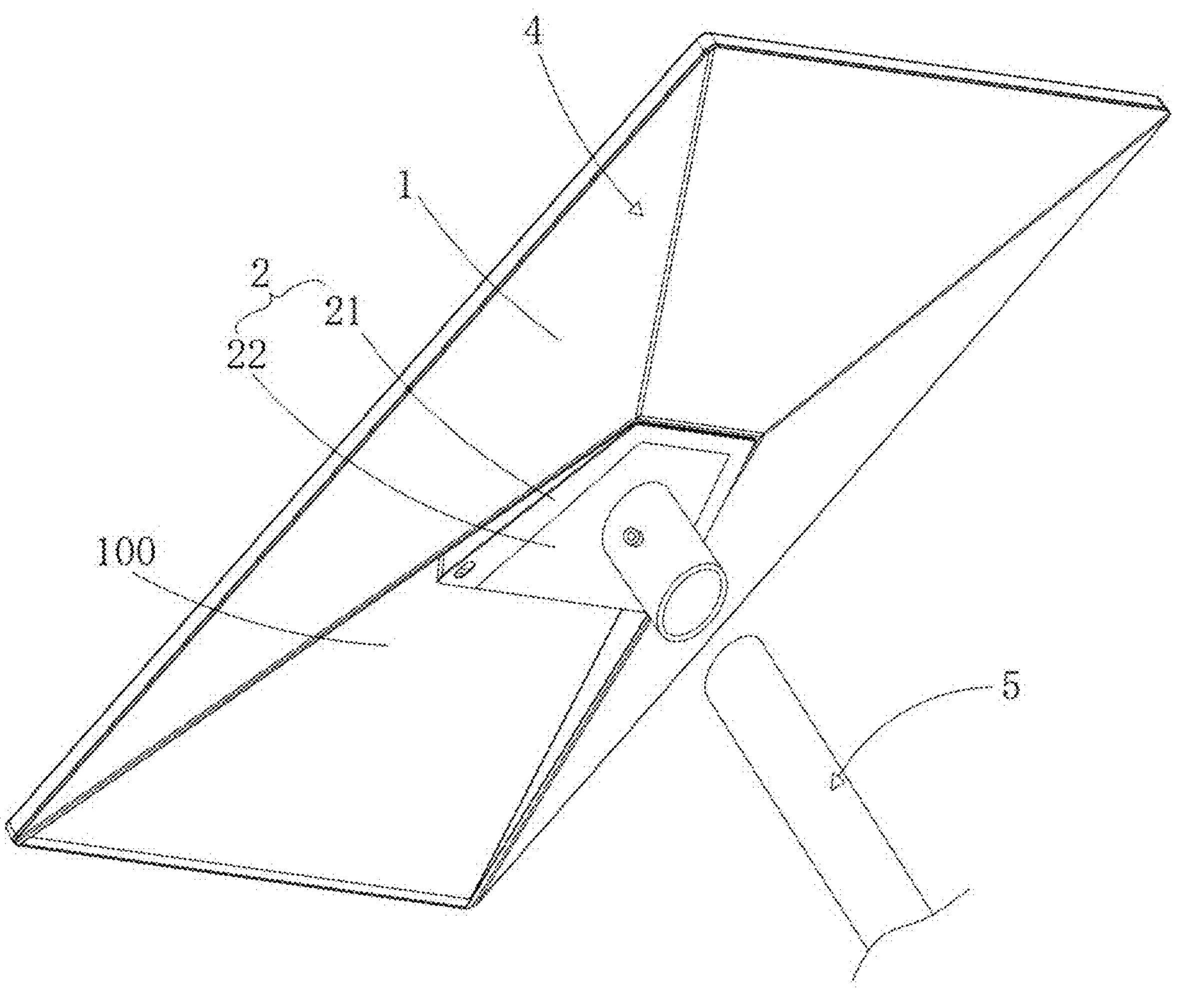
FIG. 23 is a structural view of the fast-detaching structure according to other embodiments of the present disclosure, showing a connection between the connection assembly and the supporting object.

Referring to FIGS. 10, 11, 15, and 16, the connection assembly 2 includes a first connection member 21 and a second connection member 22. The main body 23 and the snapping arm 24 are arranged on the first connection member 21. The first connection member 21 can be mounted in the mounting slot 100. The second connection member 22 is mounted on the first connection member 21. The second connection member 22 can support or can be connected to the supporting object 5. As shown in FIG. 5, the second connection member 22 is used as the supporting object 5. As shown in FIG. 23, the second connection member 22 is mounted on the supporting object 5.

Figure 12:
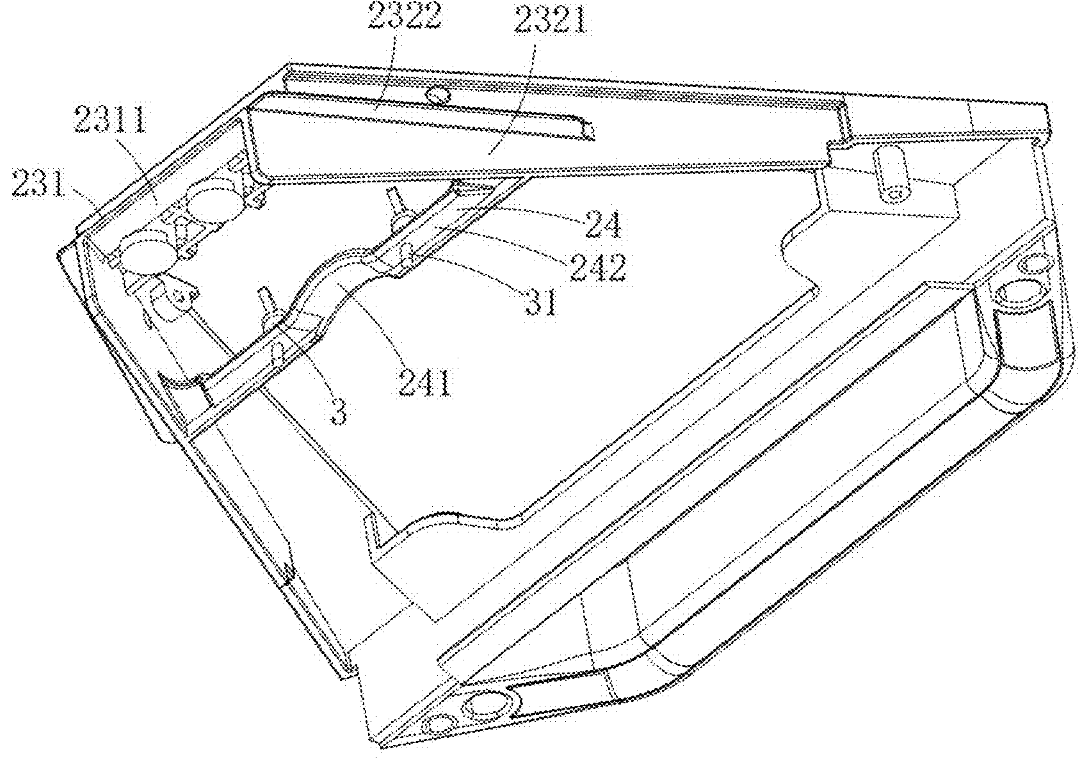
FIG. 12 is a structural view of the fast-detaching structure according to another embodiment of the present disclosure, showing a connection structure between a snapping member and the snapping arm.

In some embodiments, as shown in FIG. 12, the snapping member 3 is movably or detachably mounted on the snapping arm 24. The snapping member 3 can at least partially protrude from the snapping arm 24 towards the bottom wall 11 to form a snapping tab 31. The user can operate the snapping member 3 to enable the snapping member 3 to be engaged in or disengaged from the slot 110. For example, the snapping member 3 is threaded, and the snapping member 3 is in a threaded connection with the snapping arm 24. A height of the snapping tab 31 relative to a bottom surface 242 of the snapping arm 24 can be adjusted by rotating the snapping member 3, and thus the snapping tab 31 can extend into or be disengaged from the slot 110.

In other embodiments, referring to FIGS. 8, 9, 11, and 16, the snapping member 3 is a snapping tab 31 integrally formed with the snapping arm 24 as a one-piece structure.

The first connection member 21 is detachably mounted in the mounting slot 100. Specifically, the first connection member 21 is fixed in the mounting slot 100 by snapping. The main body 23 includes two abutting side walls 232. The two abutting side walls 232 are arranged the two positioning walls 12 in a one-to-one correspondence, and the two abutting side walls 232 are symmetrically arranged relative to each other. The snapping arm 24 is connected to the two abutting side walls 232. The snapping arm 24 can be elastically deformed. The snapping member 3 at least partially protrudes from the snapping arm 24 towards the bottom wall 11 to form the snapping tab 31. The snapping arm 24 is arranged with a drive portion 241. The drive portion 241 can drive the snapping arm 24 to elastically deform upwards. The deformation of the snapping arm 24 drives the snapping member 3 to be engaged in or disengaged from the slot 110 along a deformation direction of the snapping arm 24. That is, the snapping member 3 can be engaged in or disengaged from the slot 110 along a direction approximately perpendicular to the bottom wall 11.

When the first connection member 21 needs to be mounted on the mounting member 1, the first connection member 21 can be placed in the mounting slot 100 and pushed towards an intersection of the two positioning walls 12 or an intersection of extended surfaces of the two positioning walls 12, until the two abutting side walls 232 respectively abut against the two positioning walls 12. At this point, the snapping tab 31 can just extend and can be engaged in the slot 110, and each of the two abutting side walls 232 also abuts against a respective one of the two fixation edges 13, and the snapping arm 24 also abuts against the bottom wall 11. When each of the two abutting side walls 232 abuts against a respective one of the two positioning walls 12, the two positioning walls 12 can limit the first connection member 21 from sliding further forward, and limit the first connection member 21 from sliding leftward or rightward. The snapping engagement of the snapping tab 31 with the slot 110 can limit a backward movement of the first connection member 21. A cooperation of the two fixation edges 13 and the bottom wall 11 can limit a vertical movement of the first connection member 21 and prevent the first connection member 21 from being disengaged upwards from the mounting slot 100. Therefore, when the snapping tab 31 snaps in the slot 110, the movement of the first connection member 21 in the front, back, left, right, up, and down six directions is limited, achieving complete fixation of the first connection member 21. At this time, the supporting object 5 can be mounted on the first connection member 21 to support the mounting member 1.

Figure 14:
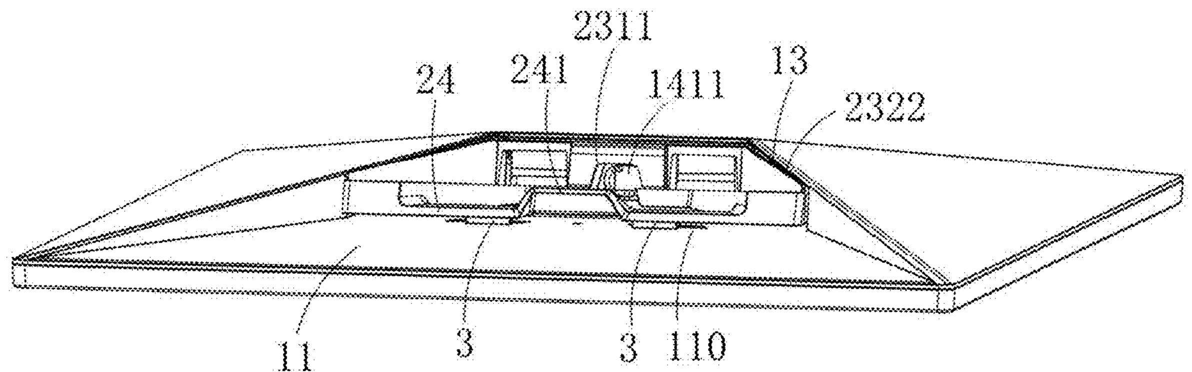
FIG. 14 is a partial structural view of the fast-detaching structure during the mounting of the first connection member in the mounting slot according to further another embodiment of the present disclosure.

Referring to FIG. 14, since the snapping tab 31 protrudes from the bottom surface 242 of the snapping arm 24, during the sliding of the first connection member 21, when the snapping tab 31 has not yet moved to the slot 110, the snapping tab 31 slides on the bottom wall 11, causing the snapping arm 24 to be in an upwarped state, and correspondingly, the abutting side wall 232 and the corresponding fixation edge 13 are no longer flush with each other, meaning that the abutting side wall 232 and the fixation edge 13 are in line contact or point contact. When a top portion of the abutting side wall 232 contacts the fixation edges 13 and continues to slide, the fixation edges 13 may exert a downward pressure on the abutting side wall 232, and the bottom wall 11 may exert an upward pressure on the snapping tab 31, causing the snapping arm 24 to elastically deform. Until the snapping tab 31 moves above the slot 110, the elastic deformation of the snapping arm 24 is restored, driving the snapping tab 31 to extend to the slot 110, completing the snapping engagement between the snapping tab 31 and the slot 110.

When the first connection member 21 needs to be detached from the mounting member 1, the user can pull the drive portion 241 upwards, causing the snapping arm 24 to elastically deform upwards, and the snapping tab 31 is accordingly lifted and disengaged from the slot 110, thereby releasing the restriction on the backward movement of the first connection member 21. The user then can slide the first connection member 21 out along the mounting slot 100, so that the first connection member 21 disengages from the fixation edges 13.

Therefore, the fast-detaching structure enables fast and secure connection and detachment, and corresponding connection structure is reliable and stable, allowing the user to easily and quickly mount the supported object 4 on the supporting object 5. The detachment and mounting process between the mounting member 1 and the first connection member 21 does not require tools. For supported objects 4 that need frequent detachment, the reinstallation process is very convenient and fast.

Specifically, considering the durability, the first connection member 21 can be made of a metal material, such as aluminum alloy, iron, etc. Alternatively, to reduce the difficulty for the user to pull the drive portion 241, the first connection member 21 can be made of a plastic material. Furthermore, to facilitate the user to pull the drive portion 241, in this embodiment, the drive portion 241 is arc-shaped, and an avoidance space 200 is formed between the drive portion 241 and the bottom wall 11. The user can insert a finger in the avoidance space 200 to more easily apply force to pull the drive portion 241.

Furthermore, the main body 23 also includes a front side wall 231 arranged opposite to the snapping arm 24. The front side wall 231 is also connected to the two abutting side walls 232. The at least one side wall 10 also include a limiting wall 14. The limiting wall 14 is located at an intersection of the two positioning walls 12 and is connected to the two positioning walls 12. When the two abutting side walls 232 abut against the two positioning walls 12 in a one-to-one correspondence, the front side wall 231 abuts against the limiting wall 14. In this embodiment, the limiting wall 14 limits a forward position of the first connection member 21.

In addition, as shown in FIGS. 6, 7, 15, and 16, the mounting member 1 is arranged with a connection post 141 at the limiting wall 14. The connection post 141 defines a through wire channel 1411 inside. The front side wall 231 correspondingly defines a receiving port 2311. The receiving port 2311 is for the connection post 141 to pass through. That is, a conducting wire 6 can pass through the receiving cavity 211 and the receiving port 2311 and then extend in the wire channel 1411.

Figure 10:
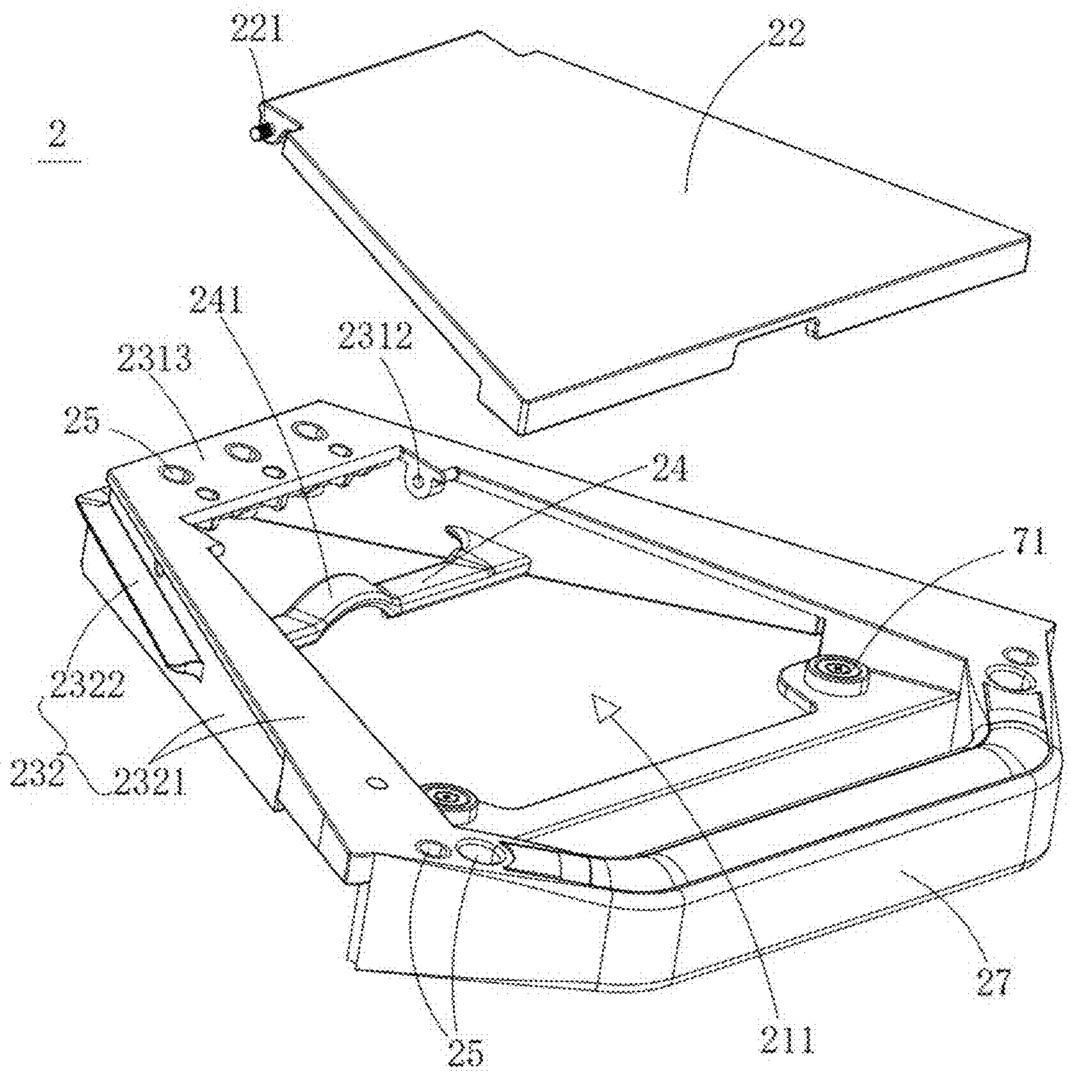
FIG. 10 is a structural view of a connection assembly according to an embodiment of the present disclosure.
Figure 15:
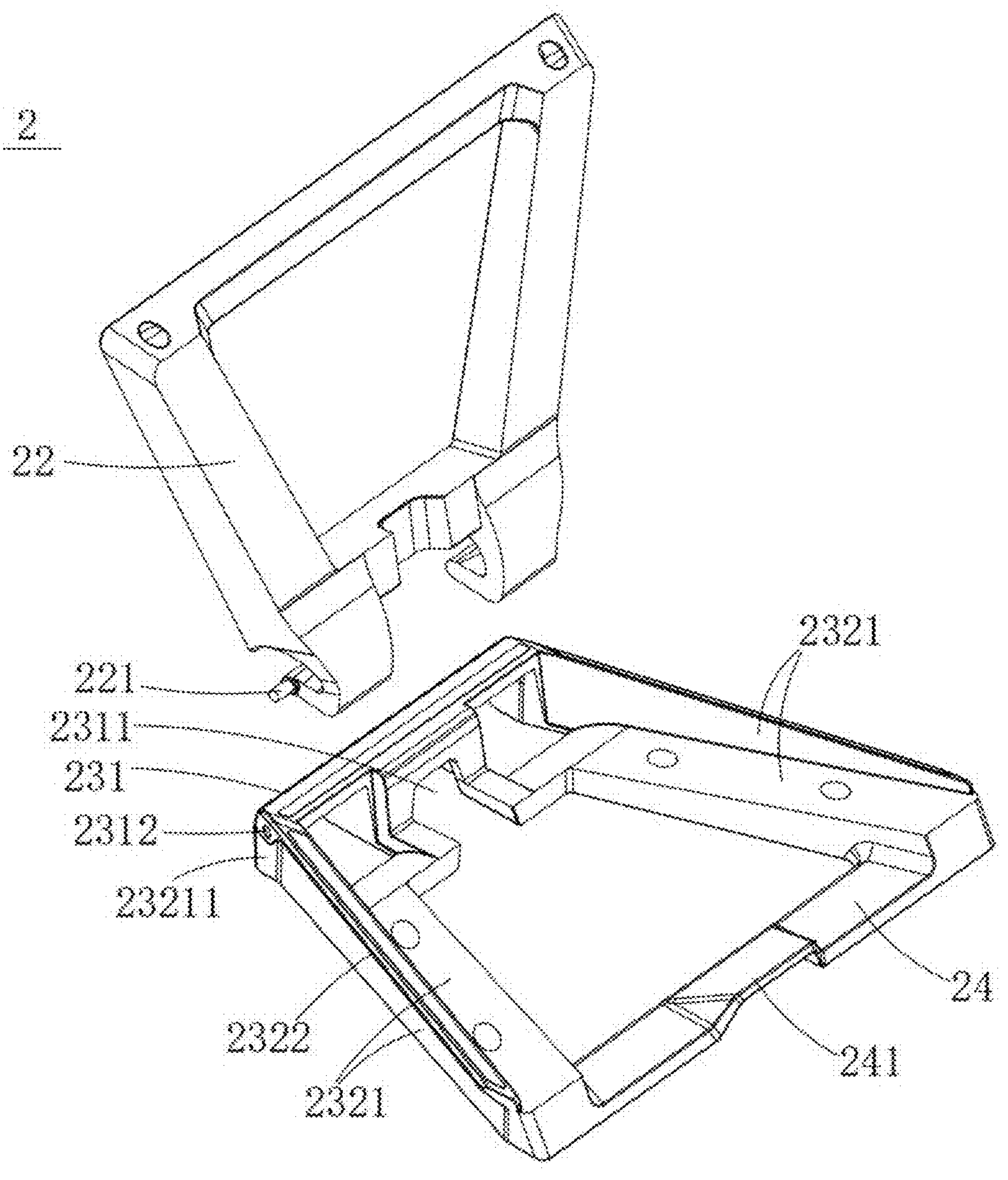
FIG. 15 is a structural view of the connection assembly according to further another embodiment of the present disclosure.

Furthermore, referring to FIGS. 10 and 15, the first connection member 21 is overall ring-shaped, and the snapping arm 24 is correspondingly in a shape of a flat plate, thereby reducing the difficulty for external force to drive the snapping arm 24 to elastically deform. Specifically, in this embodiment, the front side wall 231, the two abutting side walls 232, and the snapping arm 24 cooperatively form a ring-shaped structure.

In addition, the two fixation edges 13 extend to a top portion of the limiting wall 14 and are connected to each other, and thus the front side wall 231 can also abut against the fixation edges 13. In this way, a contact area between the first connection member 21 and the fixation edges 13 can be increased, and the connection stability between the first connection member 21 and the mounting member 1 can be strengthened.

Figure 11:
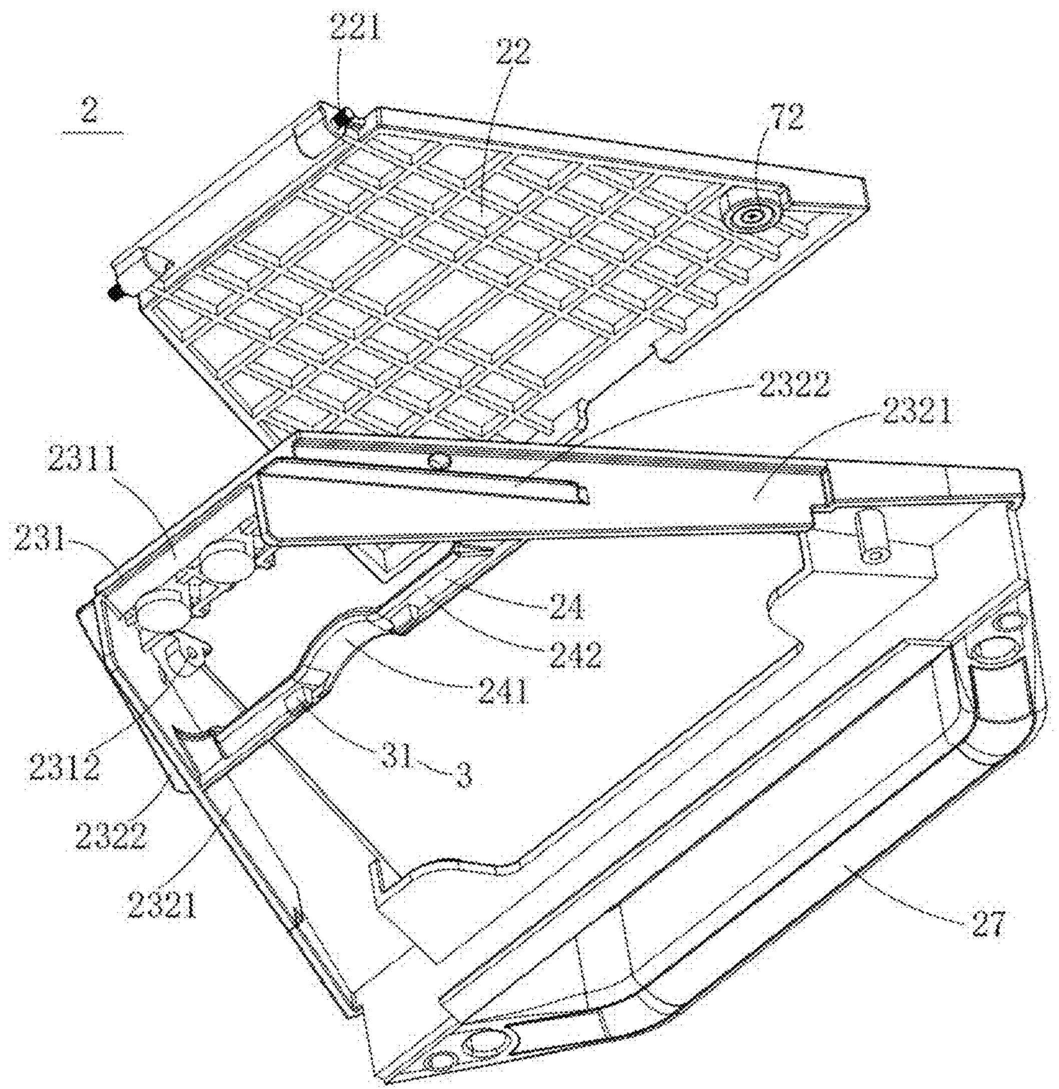
FIG. 11 is another structural view of the connection assembly according to an embodiment of the present disclosure.
Figure 16:
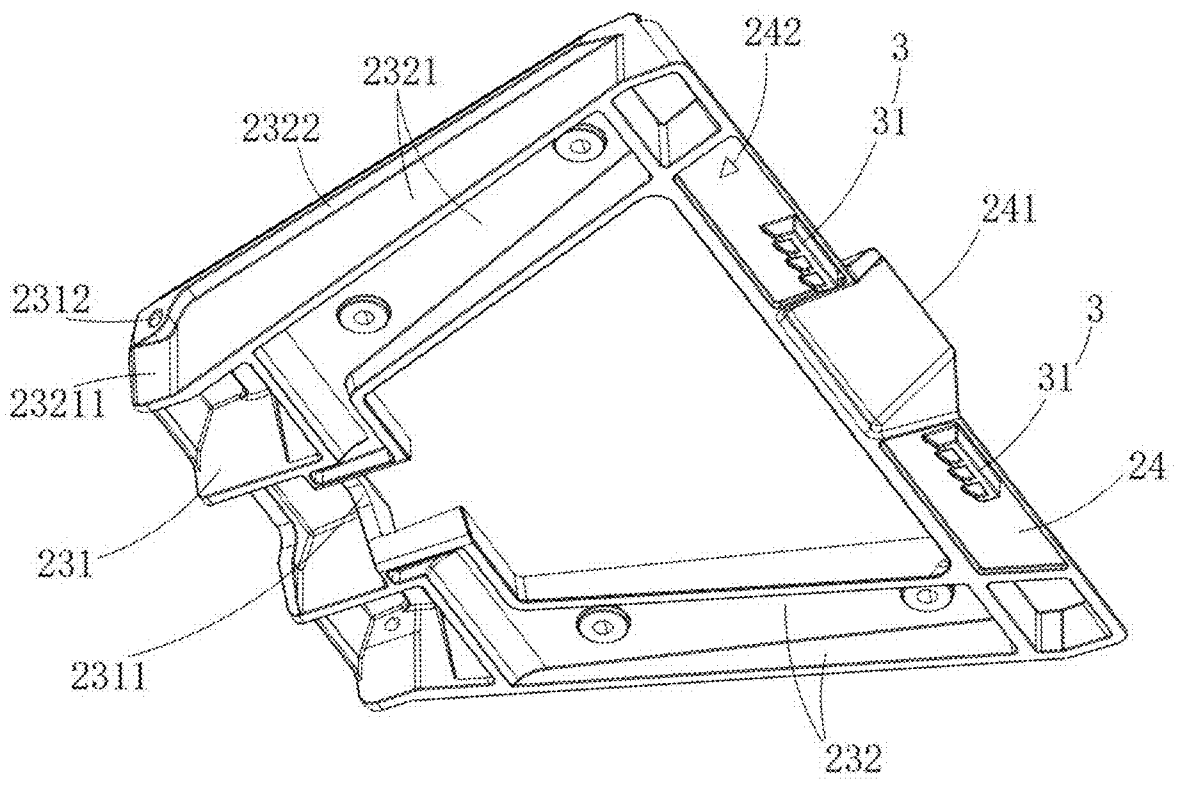
FIG. 16 is a structural view of the first connection member according to further another embodiment of the present disclosure.

Furthermore, to improve a snapping strength between the snapping tab 31 and the slot 110, in this embodiment, as shown in FIGS. 11 and 16, two snapping tabs 31 are arranged on the snapping arm 24. The two snapping tabs 31 are arranged mirror-symmetrically with the drive portion 241 as a center. Correspondingly, two slots 110 are formed in the bottom wall 11, and the two snapping tabs 31 can be engaged in the two slots 110 in a one-to-one correspondence. By increasing the number of snapping tabs 31, the snapping strength between the first connection member 21 and the mounting member 1 can be improved. Since each of the two snapping tabs 31 is located on a respective side of the drive portion 241, when the drive portion 241 is pulled, each of the two snapping tabs 31 can be driven to disengage from the slot 110 simultaneously.

According to the principle of interaction of forces, when the fixation edge 13 presses against the abutting side wall 232, the fixation edge 13 may receive a reaction force from the abutting side wall 232, so both the fixation edge 13 and the abutting side wall 232 may undergo a certain degree of elastic deformation. When a thickness of the abutting side wall 232 at a point of contact with the fixation edge 13 is too thick, the deformation during contact between the fixation edge 13 and the abutting side wall 232 may be concentrated on the fixation edge 13. When the fixation edge 13 undergoes large deformations multiple times, the fixation edge 13 is prone to collapse. In this embodiment, to reduce a deformation amplitude of the fixation edge 13, each of the two abutting side walls 232 includes a connecting rod 2321 and an abutting edge 2322. Each of the front side wall 231 and the snapping arm 24 is connected to two connecting rods 2321. The abutting edge 2322 is arranged on the connecting rod 2321 and extends towards corresponding positioning wall 12, and a thickness of the abutting edge 2322 is smaller than a thickness of the connecting rod 2321. The abutting edge 2322 can be located at a top portion of the connecting rod 2321 or in a middle portion of a side wall of the connecting rod 2321. As shown in FIGS. 15 and 16, the abutting edge 2322 is located at the top portion of the connecting rod 2321. As shown in FIGS. 10 and 11, the abutting edge 2322 is located in the middle portion of the side wall of the connecting rod 2321. Therefore, in this embodiment, each of the two abutting edges 2322 abuts against a respective one of the two positioning walls 12, and when each of the two abutting edges 2322 abuts against a respective one of the two positioning walls 12, the two abutting edges 2322 also abut against the two fixation edges 13 in a one-to-one correspondence. During the mounting of the first connection member 21 by sliding, the interaction occurs between the abutting edge 2322 and the fixation edge 13. The thickness of the abutting edge 2322 is comparable to a thickness of the fixation edge 13, and the deformation generated during the interaction may be evenly distributed between the abutting edge 2322 and the fixation edge 13, thereby reducing the deformation amplitude of the fixation edge 13. As shown in FIGS. 15 and 16, a front end 23211 of the connecting rod 2321 is connected to the front side wall 231. The front end 23211 bends outward towards an outer surface of the positioning wall 12, thereby reducing a sharpness of the abutting edge 2322 at the front side wall 231.

Furthermore, when the first connection member 21 needs to be removed from the mounting member 1, the user only needs to drive the flat snapping arm 24 to elastically deform upwards, requiring less pulling force from the user on the drive portion 241. In addition, during the elastic deformation of the snapping arm 24, not only will the snapping arm 24 have an elastic force tending to return to an original shape, but the two connecting rods 2321 will also generate a pulling force on the snapping arm 24. When the snapping tab 31 moves above the slot 110, the pulling force of the connecting rod 2321 on the snapping arm 24 is mainly used to straighten the snapping arm 24, that is, to drive the snapping arm 24 to return to a flat state, and correspondingly, to press the snapping tab 31 in the slot 110.

Referring to FIGS. 3, 4, 8, 10, and 11, in some embodiments, the first connection member 21 defines a receiving cavity 211. The second connection member 22 can open or cover the receiving cavity 211. Both the snapping arm 24 and the snapping member 3 are located in the receiving cavity 211. The receiving cavity 211 can provide a storage space for the user, which can be used to store small tools, items related to the mounting member 1, and so on. Correspondingly, in this embodiment, the second connection member 22 is arranged as a plate-like structure.

One end of the second connection member 22 is rotatably mounted on the first connection member 21 and is close to the front side wall 231. The first connection member 21 is overall ring-shaped. The bottom wall 11, the first connection member 21, and the second connection member 22 cooperatively define the receiving cavity 211. Specifically, a shaft hole 2312 can be formed in the front side wall 231 or the abutting side wall 232, and the second connection member 22 may be connected to first connection member 21 at the shaft hole 2312 via a first rotation shaft 221.

Figure 4:
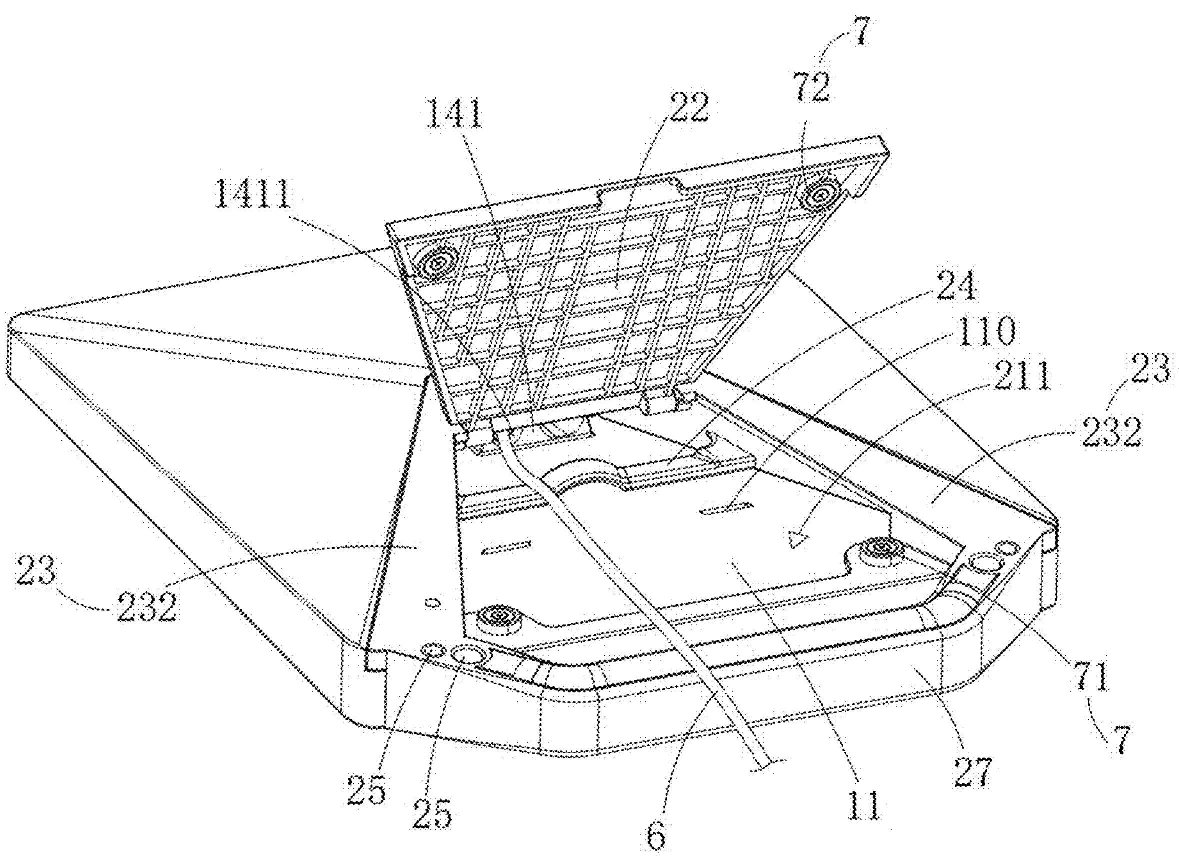
FIG. 4 is a schematic view of the overall structure of the fast-detaching structure according to an embodiment of the present disclosure, showing the second connection member opening the receiving cavity.

Referring to FIG. 4, the fast-detaching structure further includes a magnetic attraction assembly 7. The magnetic attraction assembly 7 is at least partially mounted on the first connection member 21 or the bottom wall 11. For example, the magnetic attraction assembly 7 includes a first magnetic member 71 and a second magnetic member 72. The first magnetic member 71 is mounted on the first connection member 21, and the second magnetic member 72 is mounted on the second connection member 22. When the second connection member 22 covers the receiving cavity 211, the first magnetic member 71 and the second magnetic member 72 attract each other to lock a positional relationship between the first connection member 21 and the second connection member 22. When the user needs to open the receiving cavity 211, an external force can be applied to the second connection member 22 to separate the first magnetic member 71 and the second magnetic member 72.

Referring to FIGS. 3, 6, 7, 10, 17 to 20, in some embodiments, the connection assembly 2 is arranged with a connection portion 25. The connection portion 25 can be connected to an additional supporting member 8. The additional supporting member 8 in these embodiments do not belong to the fast-detaching structure. In other embodiments, the fast-detaching structure is arranged with at least one additional supporting member 8, and the additional supporting member 8 is arranged with a mounting portion 81 adapted to the connection portion 25. It should be noted that this additional supporting member 8 is equivalent to the supporting object 5. Since some additional supporting members 8 are small in size, the additional supporting members 8 can be stored in the receiving cavity 211 for easy portability.

Furthermore, the connection portion 25 is arranged as a hole. For example, the connection portion 25 is a threaded hole, and correspondingly, the mounting portion 81 is a threaded post. The mounting portion 81 can be screwed and fixed in the connection portion 25. For another example, the connection portion 25 is a straight hole, and the mounting portion 81 is a cylindrical structure with a diameter larger than a diameter of the connection portion 25. The mounting portion 81 can be inserted in the connection portion 25, and can be in an interference fit with the connection assembly 2.

Figure 17:
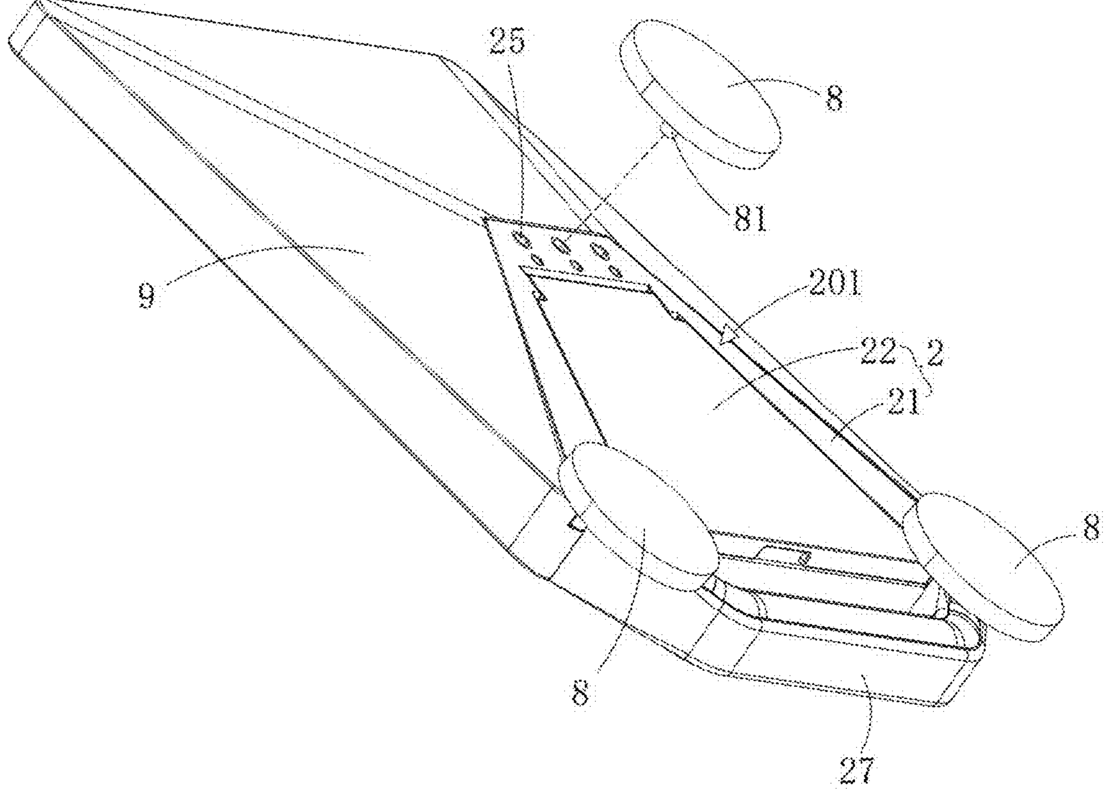
FIG. 17 is a structural view of the fast-detaching structure connected with an additional supporting member according to an embodiment of the present disclosure.
Figure 18:
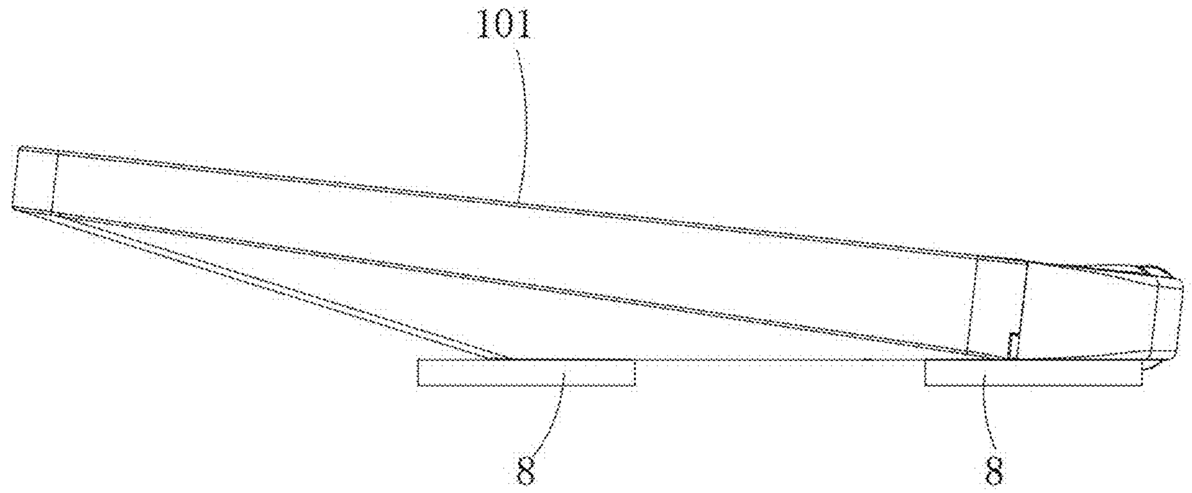
FIG. 18 is a structural view of the fast-detaching structure supported by the additional supporting member according to an embodiment of the present disclosure.

Regarding the location of the connection portion 25, in some embodiments, the mounting member 1 has a front side 101 and a back side 102. The mounting slot 100 is located in the back side 102 of the mounted member 1. Correspondingly, the connection assembly 2 is also mounted on a back side of the supported object 4, so that when the connection assembly 2 performs support or is connected to a supporting object 5, a front side of the supported object 4 faces forward or upward. Therefore, as shown in FIGS. 17 and 18, the connection portions 25 are distributed on a side 201 of the connection assembly 2 away from the mounting member 1.

In addition, the limiting wall 14 of the mounting member 1 is roughly located at a center of gravity of the mounting member 1. Therefore, in some embodiments, at least one connection portion 25 is arranged on a top surface 2313 of the front side wall 231. That is, when the additional supporting member 8 is mounted on the connection portion 25 located on the front side wall 231, it is equivalent to at least one additional supporting member 8 supporting the mounting member 1 at the center of gravity. This distribution structure of the connection portion 25 makes the support of the supported member 4 by the connection assembly 2 and the additional supporting member 8 more stable.

Figure 19:
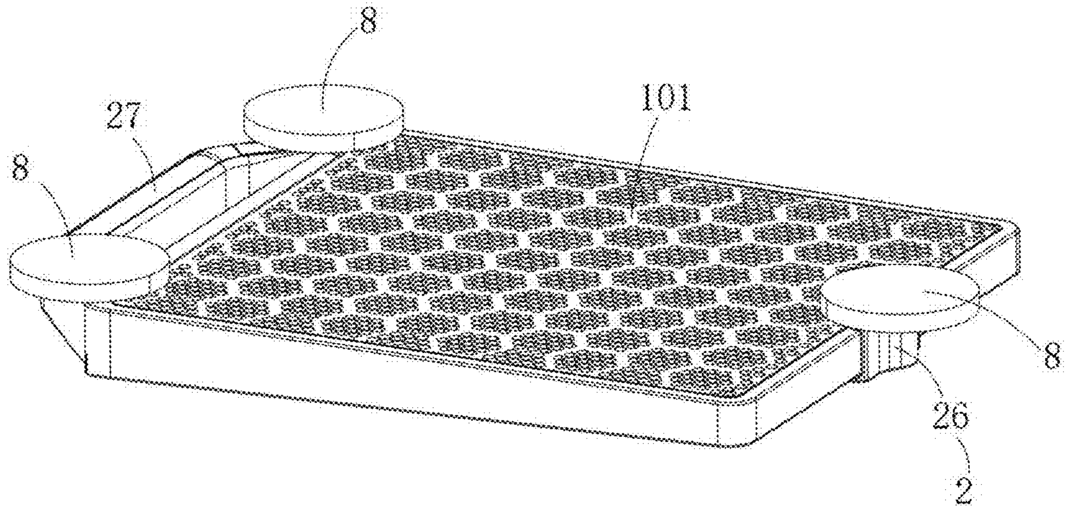
FIG. 19 is a structural view of the fast-detaching structure according to an embodiment of the present disclosure, with the additional supporting member arranged on a front side of mounting member.

Furthermore, a plurality of connection portions 25 are provided, and the plurality of connection portions 25 are collectively arranged in a triangular, rectangular, trapezoidal, or circular pattern. Correspondingly, for example, as shown in FIGS. 17 and 19, three additional supporting members 8 are collectively arranged in the triangular pattern.

Figure 20:
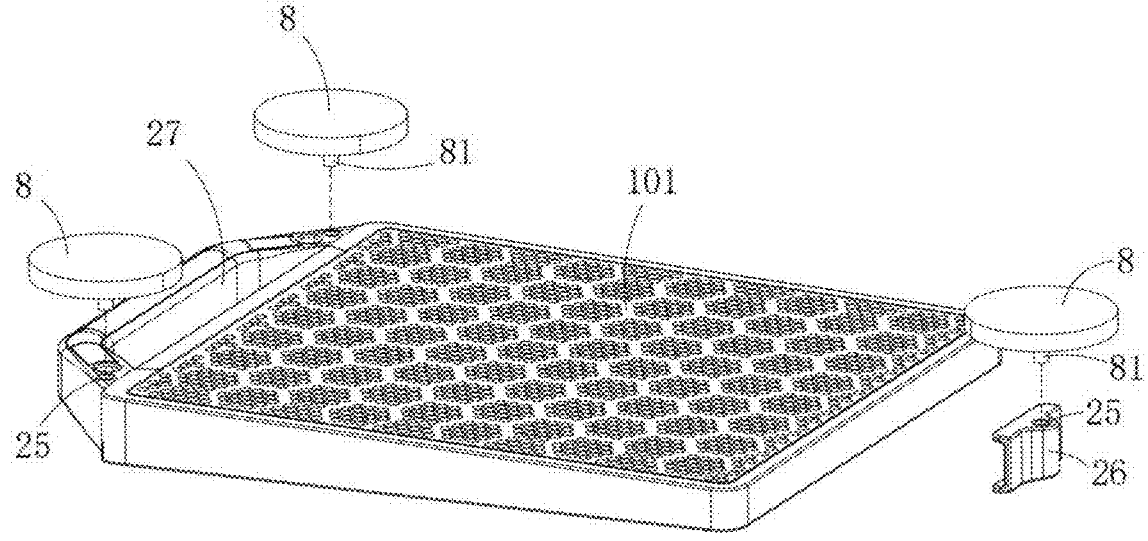
FIG. 20 is a structural view of the fast-detaching structure according to an embodiment of the present disclosure, with the connection portion partially facing the front side of the mounting member.

In some embodiments, the connection assembly 2 further includes an extension member 26. The extension member 26 is mounted at an edge of the mounting member 1. At least one connection portion 25 is arranged on the extension member 26, and at least one connection portion 25 is arranged on the first connection member 21 or the second connection member 22. For example, as shown in FIGS. 19 and 20, the extension member 26 is mounted on a side of the mounting member 1 away from the first connection member 21, providing enhanced stability for the mounting member 1. Specifically, the extension member 26 can be arranged in a "C" shape, so that the extension member 26 is mounted on the mounting member 1 in a clamping manner.

In some embodiments, depending on the usage of the supported object 4, some connection portions 25 can also be arranged towards the front side 101 of the mounting member 1. For example, as shown in FIGS. 19 and 20, the front side 101 of the mounting member 1 faces upwards, and three additional supporting members 8 are provided and mounted on the extension member 26 or the first connection member 21. Each of the three additional supporting members 8 is located above the mounting member 1, i.e., above the front side 101 of the mounting member 1. The additional supporting member 8 can be arranged with an adsorption function, enabling the mounting member 1 to be adsorbed to some top surfaces with the front side 101 facing upward.

Regarding the additional supporting member 8, at least one additional supporting member 8 is one or more of a suction cup with a mounting portion 81, a magnetic attraction member with the mounting portion 81, a foot pad with the mounting portion 81, and a strap with the mounting portion 81. The figures only show embodiments where the additional supporting member 8 is arranged as a disc.

Figure 8:
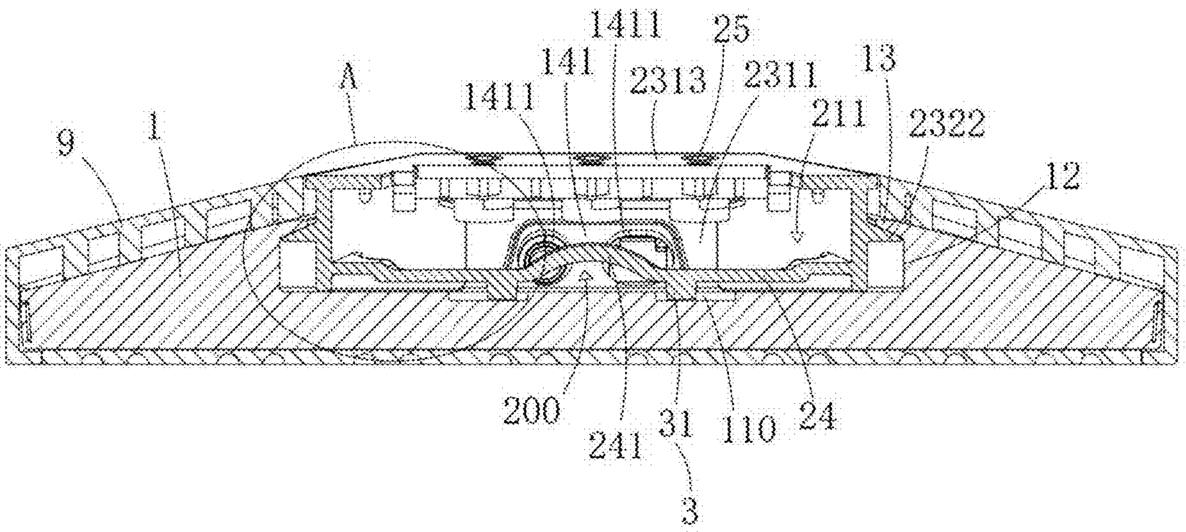
FIG. 8 is a cross-sectional view of the fast-detaching structure according to an embodiment of the present disclosure, showing a snapping arm snapped in the slot via a snapping tab.
Figure 9:
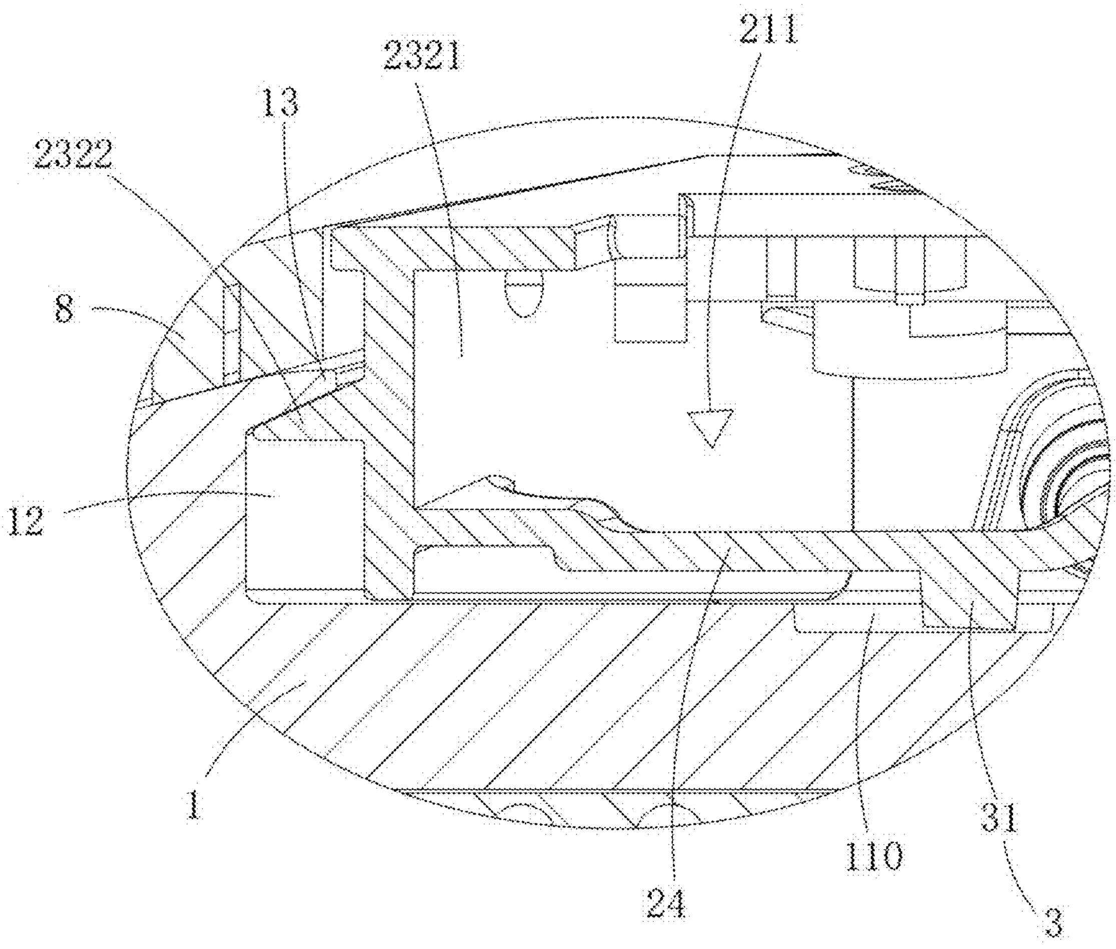
FIG. 9 is an enlarged view of a portion A in FIG. 8.
Figure 21:
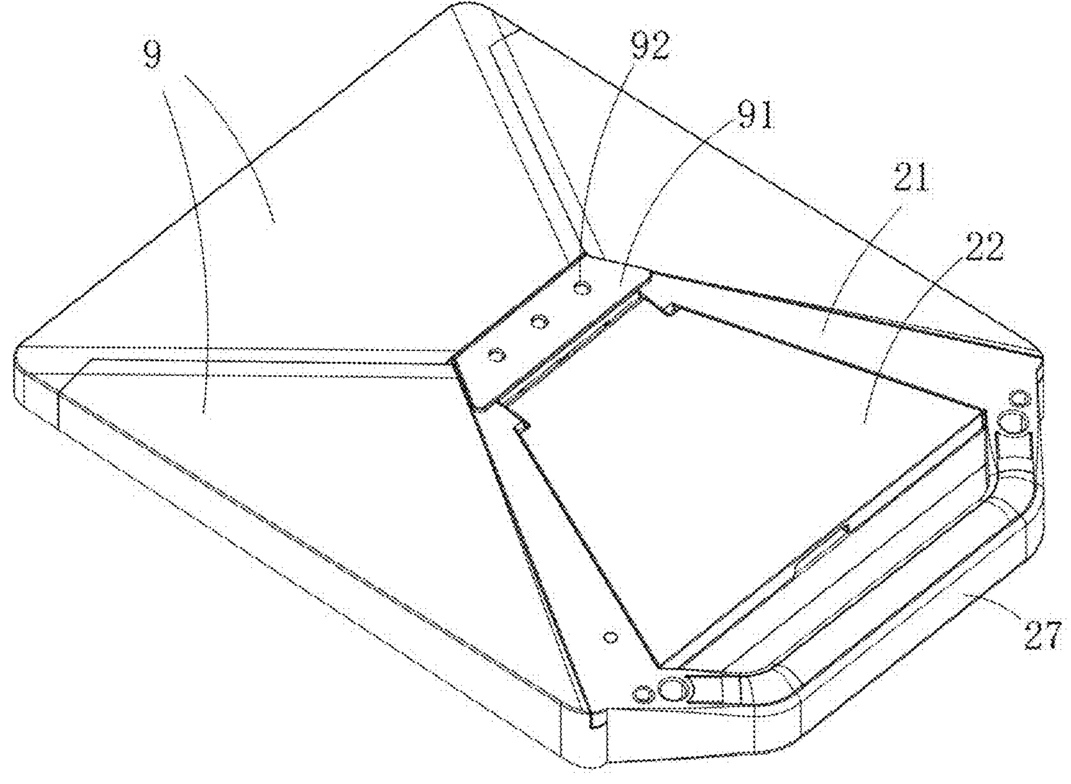
FIG. 21 is a structural view of the fast-detaching structure according to an embodiment of the present disclosure, with a casing arranged with a connecting plate.

Referring to FIGS. 6, 8, and 21, in some embodiments, the fast-detaching structure further includes a casing 9. The casing 9 sleeves the edge of the mounting member 1 and covers the back side 102 of the mounting member 1. Specifically, a position of the casing 9 corresponding to the mounting slot 100 is hollowed out, meaning that the casing 9 does not block the mounting slot 100, allowing the connection assembly 2 to be disassembled and assembled while the casing 9 is mounted to the mounting member 1. Furthermore, as shown in FIG. 21, the casing 9 can be arranged with a connecting plate 91 at a position corresponding to the front side wall 231. The connecting plate 91 defines a through hole 92. A position of the through hole 92 corresponds to a position of the connection portion 25 on the front side wall 231, and the connecting plate 91 and the connection assembly 2 can be connected and fixed through the additional supporting member 8.

Figure 22:
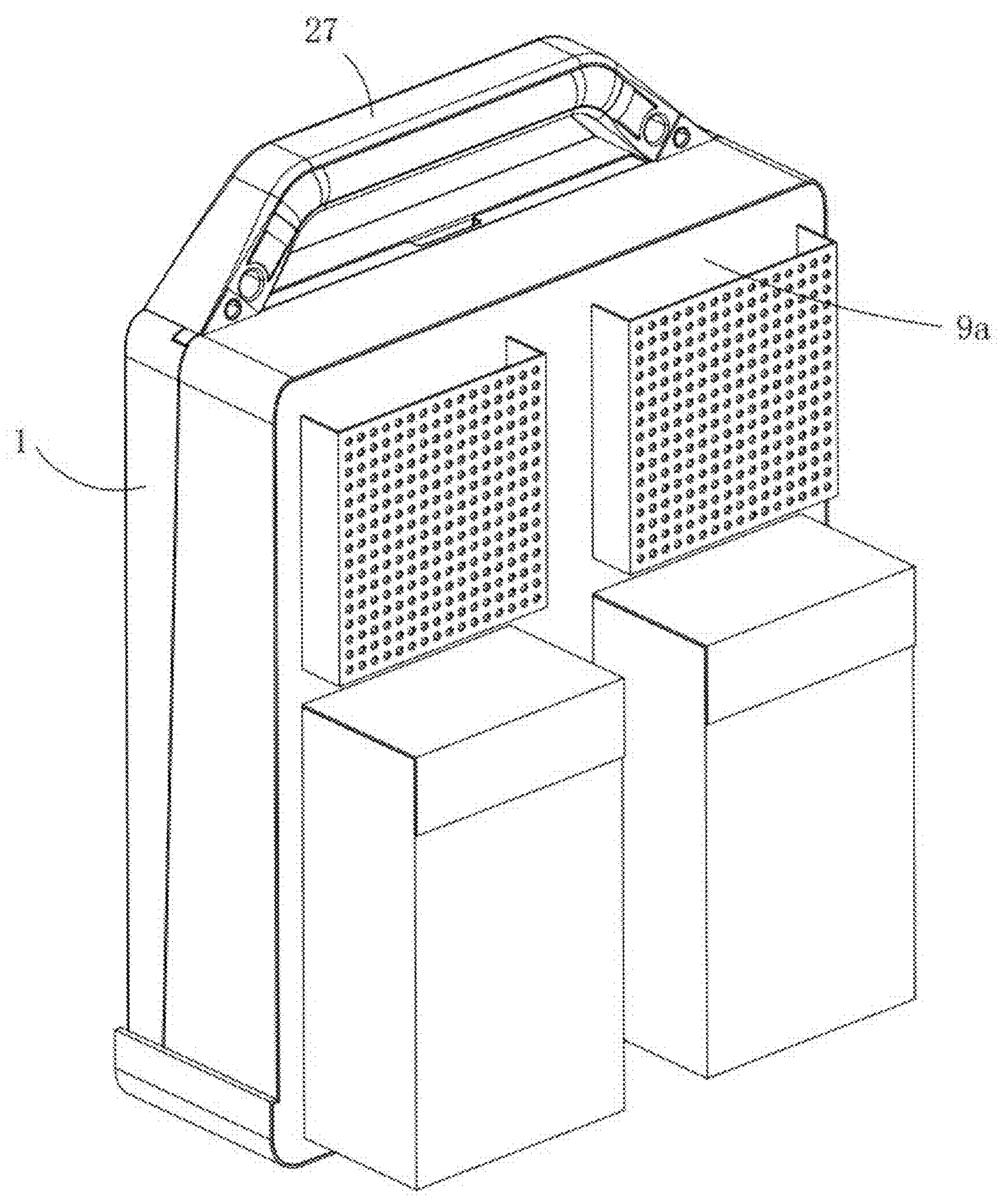
FIG. 22 is a structural view of the fast-detaching structure according to an embodiment of the present disclosure, showing a storage member.

Referring to FIG. 22, in some embodiments, the fast-detaching structure further includes a storage member **9*a*. The storage member 9*a* is arranged with several storage pockets, which can store items. The storage member 9*a* can be a portion of the casing 9** or used as an accessory.

In some embodiments, the mounting slot 100 has an open side 15 extending through to the edge of the mounting member 1. The open side 15 is unique, and the connection assembly 2 needs to be mounted in the mounting slot 100 from the open side 15. The connection assembly 2 extends towards the open side 15 and forms a handle 27 located out of the mounting slot 100, so that the handle 27 is connected to the two abutting side walls 232. Specifically, the first connection member 21 extends beyond the open side 15 to form the handle 27, thereby facilitating the user to carry the mounting member 1. Of course, the handle 27 can be integrally formed with the first connection member 21 as a one-piece structure, or the handle 27 can be a split structure and positionally fixed to the first connection member 21 with bolts.

Obviously, the above-described embodiments are only a part of, not all of, the embodiments of the present disclosure. The accompanying drawings show preferred embodiments of the present disclosure and do not limit the scope of the present disclosure. The present disclosure may be achieved in various forms. These embodiments are provided for the purpose of understanding the present disclosure more thoroughly and comprehensively. Although the present disclosure has been described in detail with reference to the above embodiments, any ordinary skilled person in the art may modify the technical solutions in the above specific embodiments or make equivalent substitutions for some technical features therein. Any equivalent structure made based on the contents of the specification and the accompanying drawings of the present disclosure, applied directly or indirectly in other related technical fields, shall all be included in the scope of the present disclosure.

What is claimed is:

1. A fast-detaching structure, configured to be mounted with a mounting member; the mounting member having a plurality of walls defining a mounting slot, one of the plurality of walls defining a plurality of slots, and each of at least two of the plurality of walls has a fixation edge;

wherein the fast-detaching structure comprises:

a connection assembly, configured to be detachably mounted in the mounting slot, and comprising a main body and a snapping arm, wherein the main body is configured to abut against the plurality of walls of the mounting member, and the snapping arm is connected to the main body; and at least one pair of snapping members, arranged on the snapping arm and each snapping member of the at least one pair of snapping members being capable of being engaged in or disengaged from a respective one of the plurality of slots;

wherein, the main body comprises a front side wall and two abutting side walls, the front side wall is connected with the two abutting side walls; when the connection assembly is mounted in the mounting slot, the two abutting side walls are configured to abut against two of the plurality of walls of the mounting member, respectively;

the snapping arm is arranged with a drive portion, each pair of snapping members of the at least one pair of snapping members are respectively disposed at two sides of the drive portion, the drive portion is configured to drive each pair of snapping members to be simultaneously disengaged out of respective slots of the plurality of slots; and for each of the two abutting sidewalls, an abutting edge is protruded from the abutting side wall and extending inclined with respect to a side surface of the abutting side wall; and the abutting edge is configured to abut against the fixation edge.

2. The fast-detaching structure according to claim 1, wherein each snapping member is a snapping tab, and the snapping tab is integrally formed with the snapping arm as a one-piece structure.

3. The fast-detaching structure according to claim 1, wherein each snapping member is movably or detachably mounted on the snapping arm.

4. The fast-detaching structure according to claim 1, wherein the snapping arm is elastically deformable, and each snapping member at least partially protrudes from the snapping arm towards the mounting member;

the drive portion is configured to drive the snapping arm to elastically deform;

each snapping member is capable of being snapped in or disengaged from the respective slot along a direction approximately perpendicular to a slot bottom of the mounting slot.

5. The fast-detaching structure according to claim 1, wherein when the connection assembly is mounted in the mounting slot, the front side wall is configured to abut against another one of the plurality of walls of the mounting member.

6. The fast-detaching structure according to claim 1, wherein the connection assembly comprises a first connection member and a second connection member, the main body and the snapping arm are formed on the first connection member, the first connection member is configured to be mounted in the mounting slot, and the second connection member is mounted on the first connection member.

7. The fast-detaching structure according to claim 6, wherein the first connection member defines a receiving cavity, and the second connection member is configured to open or cover the receiving cavity, and the snapping arm and each snapping member are located in the receiving cavity.

8. The fast-detaching structure according to claim 7, wherein the second connection member is rotatably mounted on the first connection member.

9. The fast-detaching structure according to claim 7, further comprising a magnetic attraction assembly, wherein the magnetic attraction assembly is at least partially mounted on the first connection member or is configured to be at least partially mounted on a slot bottom of the mounting slot;

when the second connection member covers the receiving cavity, the magnetic attraction assembly connects and locks the first connection member and the second connection member.

10. The fast-detaching structure according to claim 1, wherein the connection assembly is arranged with at least one connection portion, and the at least one connection portion is configured to be connected to at least one additional supporting member.

11. The fast-detaching structure according to claim 10, wherein the at least one connection portion is arranged as a hole, and is configured to receive the at least one additional supporting member matched with the hole.

12. The fast-detaching structure according to claim 11, wherein the at least one connection portion is a threaded hole.

13. The fast-detaching structure according to claim 10, wherein the at least one connection portion is distributed on a side of the connection assembly away from the mounting member.

14. The fast-detaching structure according to claim 13, wherein the number of the at least one connection portion is more than one, at least one of the more than one connection portion is arranged on the front side wall, and the more than one connection portion is arranged in a triangular, rectangular, trapezoidal, or circular pattern.

15. The fast-detaching structure according to claim 10, wherein the connection assembly comprises a first connection member, a second connection member, and an extension member, the main body and the snapping arm are formed on the first connection member, the first connection member is configured to be mounted in the mounting slot, the second connection member is mounted on the first connection member, and the extension member is configured to be mounted at an edge of the mounting member;

the number of the at least one connection portion is more than one, at least one of the more than one connection portion is arranged on the extension member, and at least one of the more than one connection portion is arranged on the first connection member or the second connection member.

16. The fast-detaching structure according to claim 15, wherein in a case that the mounting member comprises a front side and a back side, and the more than one connection portion is configured to be arranged towards the front side of the mounting member.

17. The fast-detaching structure according to claim 10, wherein the fast-detaching structure further comprises the at least one additional supporting member, wherein the at least one additional supporting member is arranged with a mounting portion matched with the connection portion.

18. The fast-detaching structure according to claim 17, wherein the mounting member comprises a front side and a back side, the fast-detaching structure further comprises a casing, wherein the casing sleeves an edge of the mounting member and covers the back side of the mounting member, and the casing is hollowed out corresponding to the mounting slot, and the casing is connectable to the connection assembly through the at least one additional supporting member.

19. The fast-detaching structure according to claim 18, wherein, the snapping arm is deformable, and deformation of the snapping arm is configured to drive each snapping member to be snapped into or taken out of the respective one of the plurality of slots along a direction of the deformation of the snapping arm.

20. A fast-detaching structure, comprising:

a main body; and a snapping arm connected to the main body;

wherein the main body comprises a front side wall and two abutting side walls, the front side wall is connected between the two abutting side walls;

for each of the two abutting side walls, an abutting edge is protruded from each abutting side wall; the abutting edge extending obliquely relative to the abutting side wall and being configured to abut against an external member for preventing the main body from moving away from the external member along a thickness direction of the main body;

the snapping arm comprises a drive portion and at least one pair of snapping members, the drive portion is configured to drive the at least one pair of snapping members to be simultaneously disengaged from snapping slots of the external member; and wherein the snapping arm is deformable, and deformation of the snapping arm is configured to drive each snapping member to be snapped into or taken out of the respective one of the snapping slots along a direction of the deformation of the snapping arm.

* * * * *